United States Patent
Yamamoto et al.

(10) Patent No.: US 7,828,098 B2
(45) Date of Patent: Nov. 9, 2010

(54) BATTERY ARRANGEMENT STRUCTURE OF A VEHICLE

(75) Inventors: Takao Yamamoto, Saitama (JP); Shigeto Inami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/509,719

(22) Filed: Aug. 25, 2006

(65) Prior Publication Data

US 2007/0045015 A1 Mar. 1, 2007

(30) Foreign Application Priority Data

Aug. 31, 2005 (JP) .............................. 2005-252926

(51) Int. Cl.
*B60K 13/00* (2006.01)

(52) U.S. Cl. .................. 180/68.5; 180/908; 180/68.3

(58) Field of Classification Search ............... 180/68.5, 180/68.3, 309, 908
See application file for complete search history.

(56) References Cited

U.S. PATENT DOCUMENTS

| | | | |
|---|---|---|---|
| 6,889,672 B2* | 5/2005 | Criddle et al. ........... 123/559.1 |
| 6,892,713 B2* | 5/2005 | Criddle et al. ........... 123/559.1 |
| 7,216,733 B2* | 5/2007 | Iwami et al. ............... 180/68.1 |
| 7,284,523 B2* | 10/2007 | Fukuzawa et al. ...... 123/179.25 |
| 7,311,170 B2* | 12/2007 | Isoda et al. ................. 180/296 |
| 7,347,296 B2* | 3/2008 | Nakamura et al. ......... 180/68.1 |
| 7,357,660 B2* | 4/2008 | Togawa ....................... 439/352 |
| 7,380,622 B2* | 6/2008 | Shimizu ..................... 180/68.1 |
| 7,475,748 B2* | 1/2009 | Nakamura et al. ......... 180/68.1 |
| 2005/0257972 A1* | 11/2005 | Iwami et al. ................ 180/68.1 |
| 2005/0257990 A1* | 11/2005 | Shimizu ..................... 180/444 |
| 2006/0230728 A1* | 10/2006 | Tsuruta et al. ............. 55/385.3 |
| 2007/0012274 A1* | 1/2007 | Kawatani ............... 123/184.21 |
| 2007/0037423 A1* | 2/2007 | Togawa ....................... 439/157 |
| 2007/0045015 A1* | 3/2007 | Yamamoto et al. ......... 180/68.5 |
| 2008/0098701 A1* | 5/2008 | Takeshima et al. ......... 55/385.3 |
| 2008/0099263 A1* | 5/2008 | Takeshima et al. ......... 180/68.3 |
| 2008/0238149 A1* | 10/2008 | Yamashita ............. 296/203.01 |
| 2008/0257630 A1* | 10/2008 | Takeshima et al. ......... 180/248 |
| 2008/0257632 A1* | 10/2008 | Takeshima et al. .......... 180/312 |
| 2009/0000841 A1* | 1/2009 | Reed et al. ................. 180/68.5 |
| 2009/0004554 A1* | 1/2009 | Reed et al. ..................... 429/97 |

FOREIGN PATENT DOCUMENTS

JP 6-53504 B2 7/1994
JP 2005-89232 A 3/2005

* cited by examiner

*Primary Examiner*—Jeffrey J Restifo
(74) *Attorney, Agent, or Firm*—Birch, Stewart, Kolasch & Birch, LLP (57) ABSTRACT

A battery arrangement structure for a vehicle that concentrates a mass of a vehicle body while effectively making use of a space in the vehicle body. The engine of the vehicle is mounted on a vehicle body frame, an intake device which includes a throttle body is connected to the engine, and a battery is arranged inside a pair of left and right upper frames which constitute the vehicle body frames. The throttle body is arranged on either one of left and right sides with respect to a vehicle body center line which extends in the longitudinal direction of a vehicle body, and the battery is arranged on anotheer side with respect to the vehicle body center line.

22 Claims, 7 Drawing Sheets

BATTERY ARRANGEMENT STRUCTURE OF A VEHICLE

CROSS-REFERENCE TO RELATED APPLICATION

The present application claims priority under 35 U.S.C. §119 to Japanese Patent Application No. 2005-252926, filed Aug. 31, 2005, the entire contents of which are hereby incorporated by reference.

BACKGROUND OF THE INVENTION

1. Field of the Invention

The present invention relates to an improvement of a battery arrangement structure of a vehicle.

2. Description of Background Art

As a conventional battery arrangement structure of a vehicle, there has been known a battery arrangement structure in which a battery is arranged between left and right rear fenders (for example, JP-B-6-53504).

In FIG. 2 and FIG. 3 of JP-B-6-53504, rear fenders 46 which cover upper portions of left and right rear wheels 28a, 28b and, at the same time, extend to a central portion from respective sides of left and right rear wheels 28a, 28b and are integrally connected with each other are described. Further, in these drawings, a baggage box 48 is integrally mounted on a center portion of the rear fenders 46 and also at the substantially center between left and right seat rails 20a, 20b, while an electric cell 52 which constitutes a battery is accommodated in a rear portion of the baggage box 48.

The above-mentioned electric cell 52 occupies a portion of the baggage box 48 and hence, a storing space of the baggage box 48 becomes small. Further, dead spaces are formed between the seat rails 20a and 20b and on both sides of the electric cell 52.

Further, since the electric cell 52 which is a heavy load is arranged in the vicinity of the rear wheels 28a and 28b, the weight distribution which a rear portion of vehicle body supports is increased. By arranging the electric cell 52 at a position closer to a front portion of the vehicle body, a mass is concentrated on a center side in the longitudinal direction of the vehicle and hence, it is possible to enhance the traveling performance of the vehicle.

SUMMARY AND OBJECTS OF THE INVENTION

It is an object of the present invention to concentrate a mass of a vehicle body while effectively making use of a space of the vehicle body by improving the battery arrangement structure of a vehicle.

According to a first aspect of the present invention, a vehicle has an engine mounted on a vehicle body frame, an intake device including a throttle body is connected to the engine, and a battery is arranged inside a pair of left and right frame members which constitute the vehicle body frame. The throttle body is arranged on either one of left and right sides with respect to a vehicle body center line which extends in the longitudinal direction of a vehicle body, and the battery is arranged on another side with respect to the vehicle body center line.

By arranging the throttle body on either one of left and right sides with respect to the vehicle body center line, a space is formed on another side with respect to the vehicle body center line. By arranging the battery in this space, it is possible to effectively make use of the space.

The throttle body is arranged close to the engine and the engine is arranged at the substantially center of the vehicle body. Accordingly, the battery arranged in the above-mentioned space is also arranged close to the engine and hence, and it is possible to arrange the battery at a position close to the center of the vehicle body.

According to a second aspect of the present invention, the air cleaner is arranged behind the battery, and the battery is arranged on the side of the connecting tube which allows the throttle body and the air cleaner to communicate with each other.

Since the connecting tube which allows the throttle body and the air cleaner to communicate with each other has a width smaller than widths of the throttle body and the air cleaner, by arranging the battery on the side of the connecting tube, it is possible to effectively make use of the space between a pair of left and right frame members and on one side of the connecting tube.

According to a third aspect of the present invention, the engine includes the exhaust device, and the exhaust pipe which constitutes the exhaust device is allowed to pass below the throttle body and to extend toward the rear portion of the vehicle body from the engine.

By arranging the throttle body and the exhaust pipe on one side with respect to the vehicle body center line and by arranging the battery on another side with respect to the vehicle body center line, the weight of the throttle body and the exhaust pipe and the weight of the battery are well balanced.

According to the first aspect of the present invention, the throttle body is arranged on either one of left and right sides with respect to a vehicle body center line and the battery is arranged on another side with respect to the vehicle body center line and hence, the battery can be arranged in the space formed by arranging the throttle body on one side with respect to the vehicle body center line. Accordingly, it is possible to effectively make use of the space of the vehicle body and hence, the vehicle body can be made compact or can be miniaturized. Further, the battery can be arranged in the vicinity of the engine and hence, it is possible to concentrate the engine and the battery which constitute heavy loads on the center side of the vehicle body. Accordingly, the traveling performance, such as turning characteristics or the like, when the vehicle is traveling can be enhanced.

According to the second aspect of the present invention, the air cleaner is arranged behind the battery and the battery is arranged on the side of the connecting tube and hence, it is possible to efficiently arrange the throttle body, the connecting tube and the air cleaner which constitute the intake device and the battery on the vehicle body whereby the vehicle body can be made compact or can be miniaturized.

According to the third aspect of the present invention, the exhaust pipe is allowed to pass below the throttle body and to extend toward the rear portion of the vehicle body from the engine and hence, by arranging the battery on the side opposite to the side on which the throttle body and the exhaust pipe are arranged with respect to the vehicle body center line, the left-and-right weight balance of the vehicle body can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
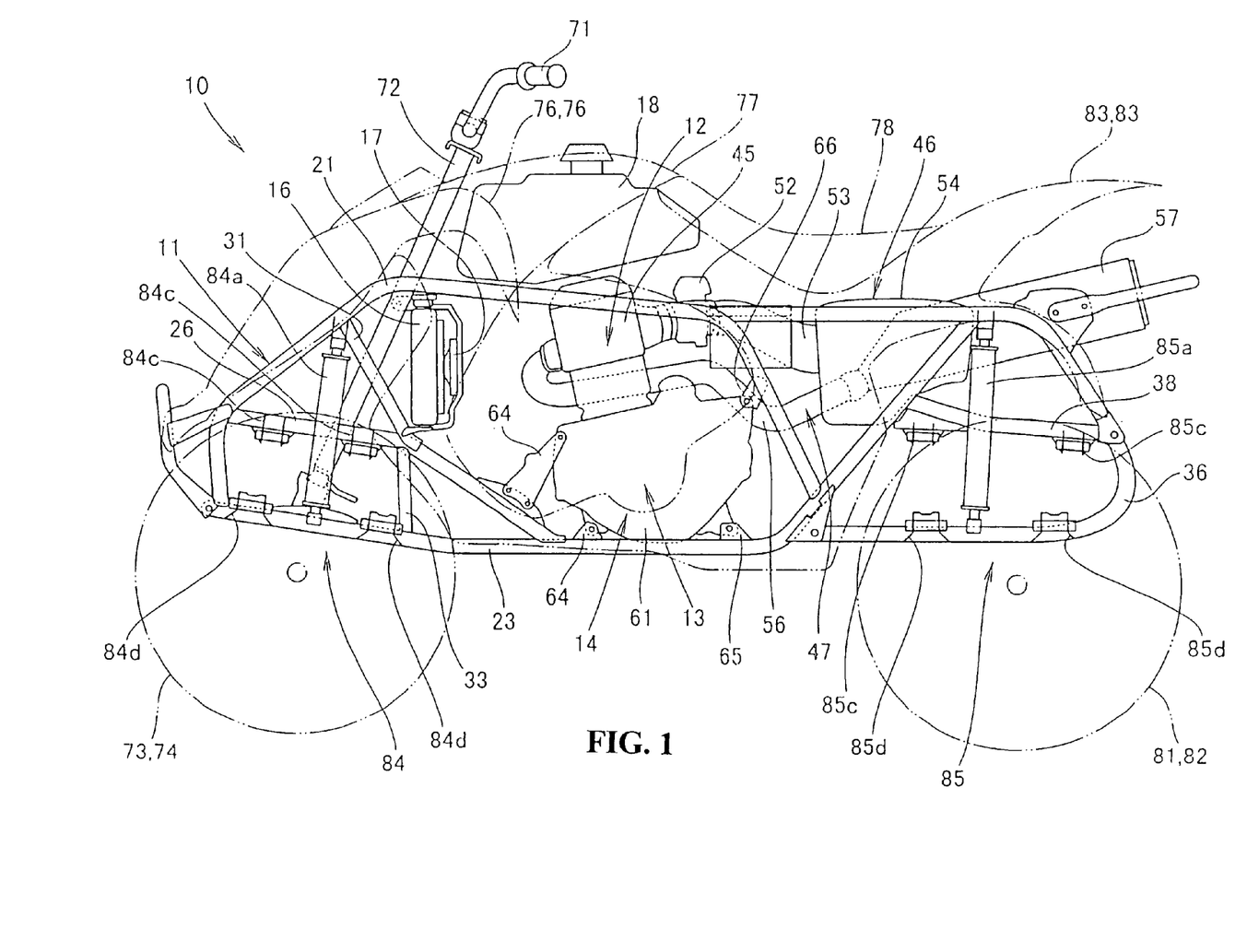
FIG. 1 is a side view of a vehicle which adopts a battery arrangement structure according to the present invention.

FIG. 1 is a side view of a vehicle which adopts the battery arrangement structure according to the present invention. The vehicle 10 is an all terrain vehicle (ATV), wherein a power unit 14 which is constituted of an engine 12 and a transmission 13 is arranged at the substantially center of a vehicle body frame 11, a radiator 16 and a radiator cooling fan 17 are arranged in front of the power unit 14, and a fuel tank 18 is arranged above the power unit 14.

The vehicle body frame 11 includes a pair of left and right upper frames 21, 22 (showing only the reader's-side upper frame indicated by symbol 21), a pair of left and right lower frames 23, 24 (showing only the reader's-side lower frame indicated by symbol 23) which are mounted on both end portions of these upper frames 21, 22, a pair of left and right front frames 26, 27 (showing only the reader's-side front frame indicated by symbol 26) which are extended between front portions of the upper frames 21, 22 and intermediate portions of the lower frames 23, 24 respectively, front upper frames 31, 32 (showing only the reader's-side indicated front upper frame by symbol 31) which are extended between intermediate portions of the front frames 26, 27 and front portions of the upper frames 21, 22, respectively, front lower frames 33, 34 (showing only the reader's-side front lower frame indicated by symbol 33) which are extended between intermediate portions of the front frames 26, 27 and front portions of the lower frames 23, 24, a pair of left and right rear frames 36, 37 (showing only the reader's-side rear frame indicated by symbol 36) having substantially a U-shape as viewed in a side view which are mounted on rear upper portions of the upper frames 21, 22 and lower rear portions of the lower frames 23, 24 respectively, and a pair of left and right rear sub frames 38, 39 (showing only the reader's-side rear sub frame indicated by symbol 38) which are extended between rear inclined portions of the lower frames 23, 24 and rear portions of the rear frames 36, 37.

The engine 12 is a drive source which connects an intake device 46 and an exhaust device 47 to an upwardly projecting cylinder portion 45 thereof.

The intake device 46 includes a throttle body 52 which is connected to a rear portion of the cylinder portion 45, a connecting tube 53 which is connected to a rear portion of the throttle body 52, and an air cleaner 54 which is connected to a rear end of the connecting tube 53.

The exhaust device 47 includes an exhaust pipe 56 which is connected to a front portion of the cylinder portion 45 and also extends rearwardly, and a muffler 57 which is connected to a rear end of the exhaust pipe 56.

The power unit 14 includes a crank case 61 and the crankcase 61 is mounted on the front frames 26, 27, the lower frames 23, 24 and the upper frames 21, 22 by way of brackets 63 to 66, respectively.

In the drawings, numeral 71 indicates a bar handle which steers left and right front wheels 73, 74 by way of a steering shaft 72, numerals 76, 76 indicate front fenders which cover front wheels 73, 74 from above, numeral 77 indicates a body cover, numeral 78 indicates a sheet, numerals 81, 82 indicate left and right rear wheels, and numerals 83, 83 indicate rear fenders which cover the rear wheels 81, 82 from above.

The vehicle 10 includes a front wheel independent suspension 84 and a rear wheel independent suspension 85 which suspend independently the left and right front wheels 73, 74 and the left and right rear wheels 81, 82.

The front wheel independent suspension 84 includes a pair of left and right front wheel suspension arms (shown in the FIG. 2) and a pair of left and right front cushion units 84a, 84b (showing only reader's-side cushion unit indicated by symbol 84a) which extend between respective upper portions of these suspension arms and the vehicle body frame 11. Here, numerals 84c, 84c indicate upper arm support portions which support upper arms which constitute the suspension arms, and numerals 84d, 84d indicate lower arm support portions which support lower arms which constitute the suspension arms.

The rear wheel independent suspension 85 includes a pair of left and right rear wheel suspension arms (shown in the FIG. 2) and a pair of left and right rear cushion units 85a, 85b (showing only reader's side cushion indicated by symbol 85a) which extend between respective upper portions of these suspension arm and the vehicle body frame 11. Here, numerals 85c, 85c indicate upper arm support portions which support upper arms which constitute the suspension arms, and numerals 85d, 85d indicate lower arm support portions which support lower arms which constitute the suspension arms.

Figure 2:
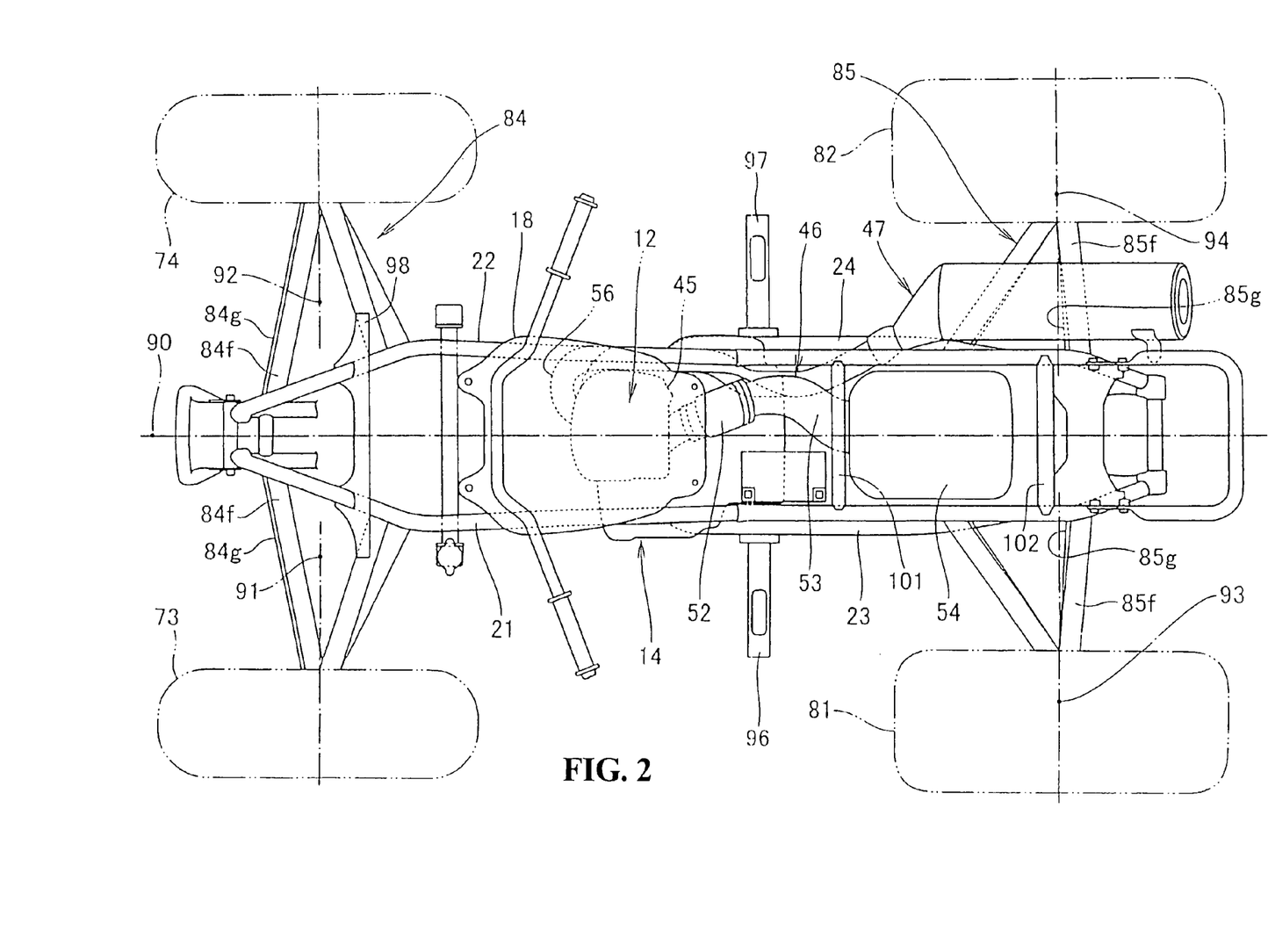
FIG. 2 is a plan view of the vehicle according to the present invention.

FIG. 2 is a plan view of the vehicle according to the present invention. The power unit 14 is positioned between the left and right upper frames 21, 22 and the left and right lower frames 23, 24, and the cylinder portion 45 of the engine 12 is positioned below the fuel tank 18.

The throttle body 52, the connecting tube 53 and the air cleaner 54 which constitute the intake device 46 extend rearwardly from the cylinder portion 45 between the left and right upper frames 21, 22, the exhaust pipe 56 which constitutes the exhaust device 47 extends rearwardly from a front portion of the cylinder portion 45 while passing below the upper frame 22 as well as below the throttle body 52 and the connecting tube 53, and the muffler 57 extends rearwardly along the vehicle body more sideward than the upper frame 22.

Further, the battery 86 is arranged between the left and right upper frames 21, 22 in a state the battery 86 is positioned close to one upper frame 21.

The drawings illustrate a pair of left and right upper arms 84f, 84f, a pair of left and right lower arms 84g, 84g, a pair of left and right upper arms 85f, 85f, a pair of left and right lower arms 85g, 85f, a vehicle body center line 90 which extends in the longitudinal direction of the vehicle body and passes through the center of a vehicle width, axes of respective wheel axles 91, 92 of the front wheels 73, 74, axes 93, 94 of respective axles of the rear wheels 81, 82, steps 96, 97 which project sideward of the vehicle body from the lower frames 23, 24, a cross member 98 which is extended between the left and right upper frames 21, 22, cross pipes 101, 102 which are extended between the left and right rear frames 36, 37.

Figure 3:
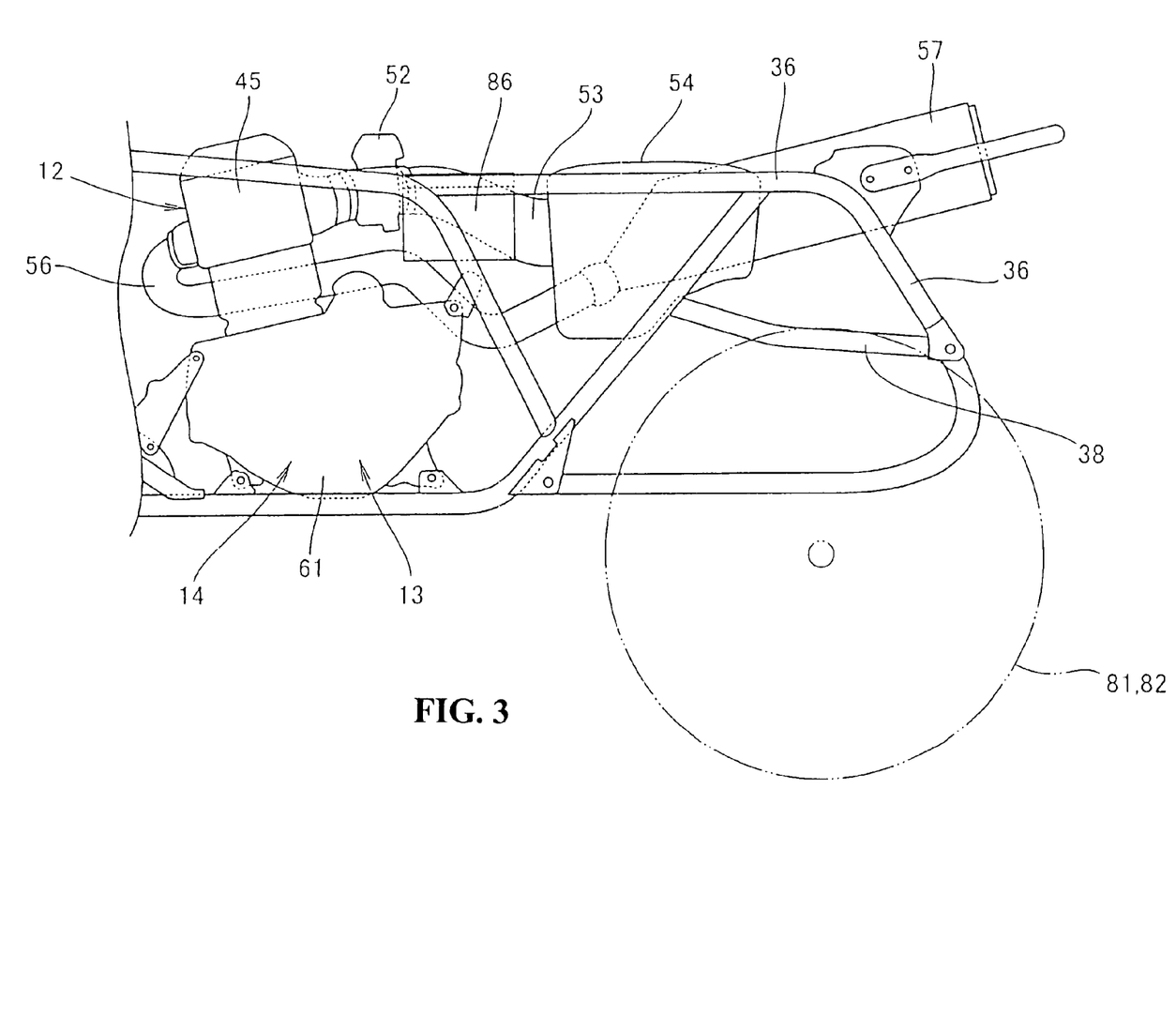
FIG. 3 is a side view of a rear portion of the vehicle according to the present invention.

FIG. 3 is a side view of a rear portion of the vehicle according to the present invention. In FIG. 3, an air cleaner 54 is positioned in front of the battery 86, and the connecting tube 53 is positioned at a height substantially equal to a height of the battery 86. connecting tube 53 is positioned at a height substantially equal to a height of the battery 86.

The exhaust pipe 56 extends rearwardly above a crank case 61 and below the battery 86, and a connecting portion of the exhaust pipe 56 with the muffler 57 is at a position where the connection portion is overlapped to the air cleaner 54 in a side view, and the muffler 57 extends obliquely in the rearward and upward direction.

An upper surface of the battery 86 and an upper surface of the air cleaner 54 are arranged substantially coplanar with an upper surface of the rear frames 36, 37 (showing only reader's-side rear frame indicated by symbol 36). Accordingly, a long sheet 78 (see FIG. 1) can be easily arranged in a space defined above the battery 86, the air cleaner 54 and the rear frame 36, 37.

Figure 4:
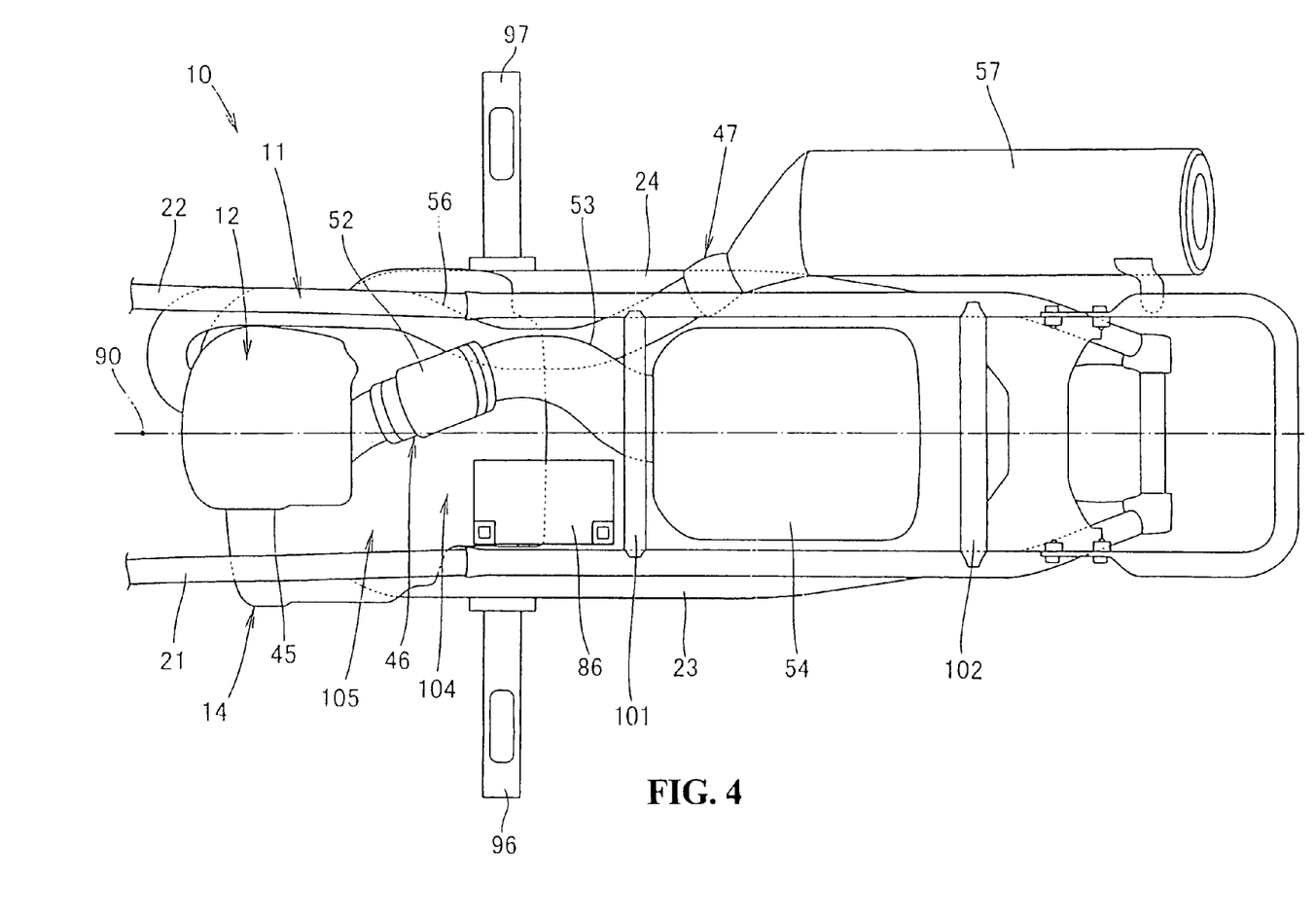
FIG. 4 is a plan view of a rear portion of the vehicle according to the present invention.

FIG. 4 is a plan view of a rear portion of the vehicle according to the present invention. Between the left and right upper frames 21, 22, the throttle body 52 and the connecting tube 53 are arranged on a right side with respect to the vehicle body center line 90, while the battery 86 is arranged on a left side with respect to the vehicle body center line 90. Further, the cylinder portion 45 and the air cleaner 54 are arranged to be overlapped with the vehicle body center line 90, and the muffler 57 is arranged outside one upper frame 22 as well as along the upper frames 22.

Further, FIG. 4 shows that the exhaust pipe 56 passes below the throttle body 52 and the connecting tube 53, and the battery 86 is arranged on one side of the connecting tube 53.

In this manner, by shifting the throttle body 52 to the upper frame 22 side from the substantially center in the vehicle width direction of the rear portion of the cylinder portion 45 and by bending the connecting tube 53 toward substantially the center in the vehicle width direction of the front portion of the air cleaner 54 from the upper frame 22 side, it is possible to define a large space 104 between the throttle body 52 as well as the connecting tube 53 and the upper frame 21, and the battery 86 can be arranged in such a space 104. Accordingly, it is possible to effectively make use of the space 105 defined between the left and right upper frames 21, 22 thus realizing the downsizing or the miniaturization of the vehicle 10.

Further, it is also possible to arrange parts in a space defined by the cylinder portion 45, the throttle body 52, the battery 86 and the upper frame 21.

Figure 5:
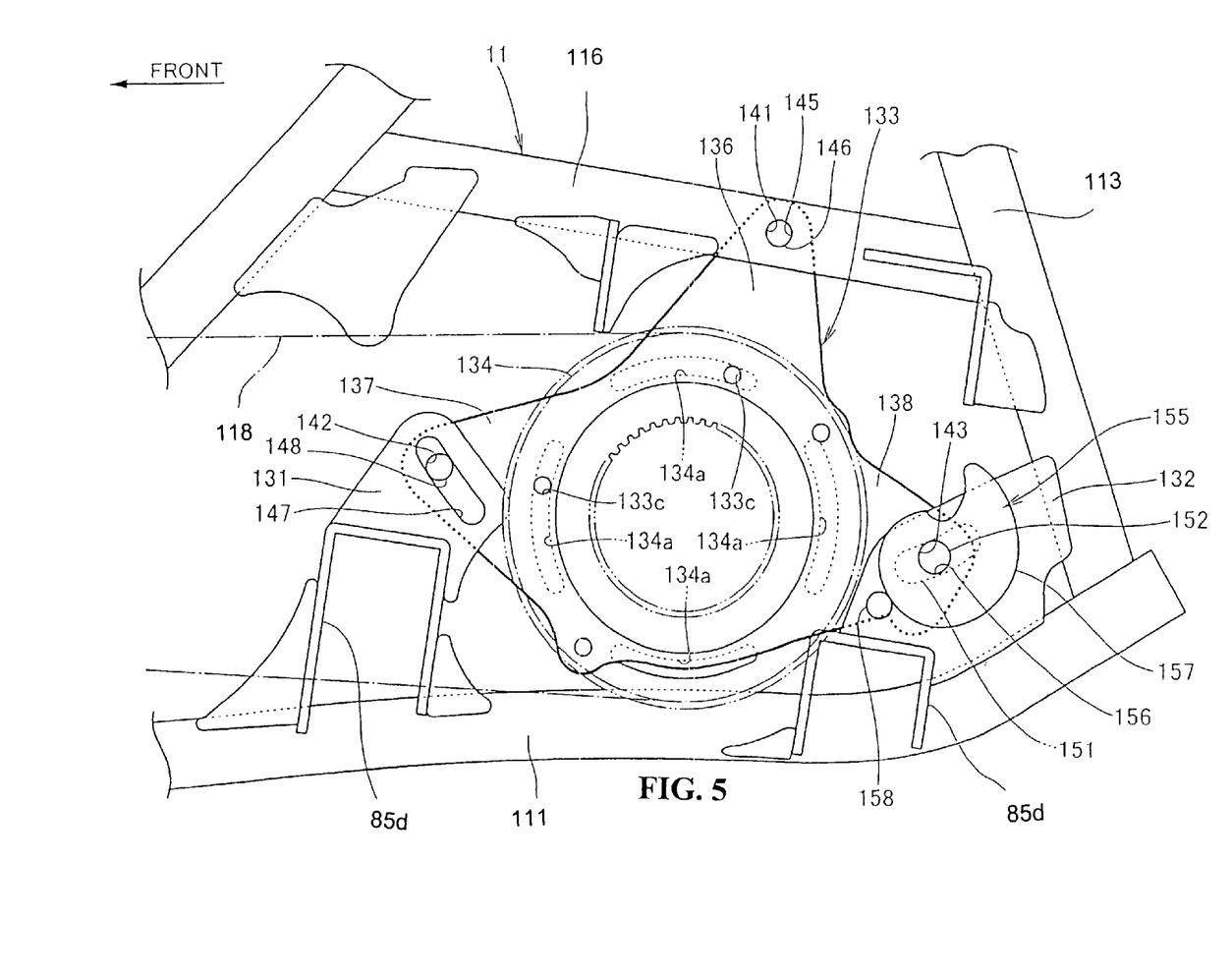
FIG. 5 is a side view of an essential part showing a drive force transmitting portion of the vehicle according to the present invention.

FIG. 5 is a side view (an arrow (FRONT) in the drawing indicating a front side of the vehicle: understood in the same manner hereinafter) of an essential part showing a drive force transmitting part of the vehicle according to the present invention. A case support bracket 131 is mounted on a front-side lower arm support portion 85d for rear wheel, a case support bracket 132 is mounted on a rear-side lower arm support portion 85d for rear wheel, rear end portions of lower frames 111, 112 (showing only reader's-side lower frame indicated by symbol 111) which constitute the rear frames 36, 37 (showing only reader's-side rear frame indicated by symbol 36) and the rear vertical frames 113, 114 (showing only reader's-side rear vertical frame indicated by symbol 113) which constitute the rear frames 36, 37, a final gear case 133 (a part whose profile being indicated by a bold line) is supported on three portions consisting of a portion of the rear sub-frame 116, 117 (showing only reader's side rear sub-frame indicated by symbol 116) and portions of the case support brackets 131, 132, and the above-mentioned chain 118 is wound around a driven sprocket 134 which is rotatably supported on the final gear case 133.

The final gear case 133 is a member which includes three arm portions 136 to 138 and bolt insertion holes 141 to 143 are formed in respective arm portions 136 to 138. The final gear case 133 is mounted on the vehicle body frame 11 as follows. The bolt through hole 141 is aligned with mounting holes 145 formed in the rear sub-frames 116, 117, a mounting bolt 146 is inserted in the bolt insertion hole 141 and the mounting holes 145, and a nut not shown in the drawings is fastened to a distal end portion of the mounting bolt 146. The bolt through hole 142 is aligned with arcuate elongated holes 147 formed in the case support bracket 131, a mounting bolt 148 is inserted in the bolt insertion hole 142 and the arcuate elongated holes 147, and a nut not shown in the drawings is fastened to a distal end portion of the mounting bolt 148. Further, the bolt through hole 143 is aligned with arcuate elongated holes 151 formed in the case support bracket 132, a mounting bolt 152 is inserted in the bolt insertion hole 143 and the arcuate elongated holes 151, and a nut not shown in the drawings is fastened to a distal end portion of the mounting bolt 152.

Numeral 155 indicates a snail cam (snail: univalve shell) and is configured such that a distance from a center of a hole portion 156 in which the mounting bolt 152 is rotatably fitted to an outer peripheral surface 157 is spirally changed, and a portion of the outer peripheral surface 157 is brought into contact with a pin 158 mounted on the case support bracket 132. Accordingly, by slackening the thread engagement between the mounting bolts 146, 148, 152 and the respective nuts and by rotating the snail cam 155, it is possible to swing the final gear case 133 in the longitudinal direction about the mounting bolt 146, whereby the driven sprocket 134 is moved in the longitudinal direction so as to adjust a tension of the chain 118.

Figure 6:
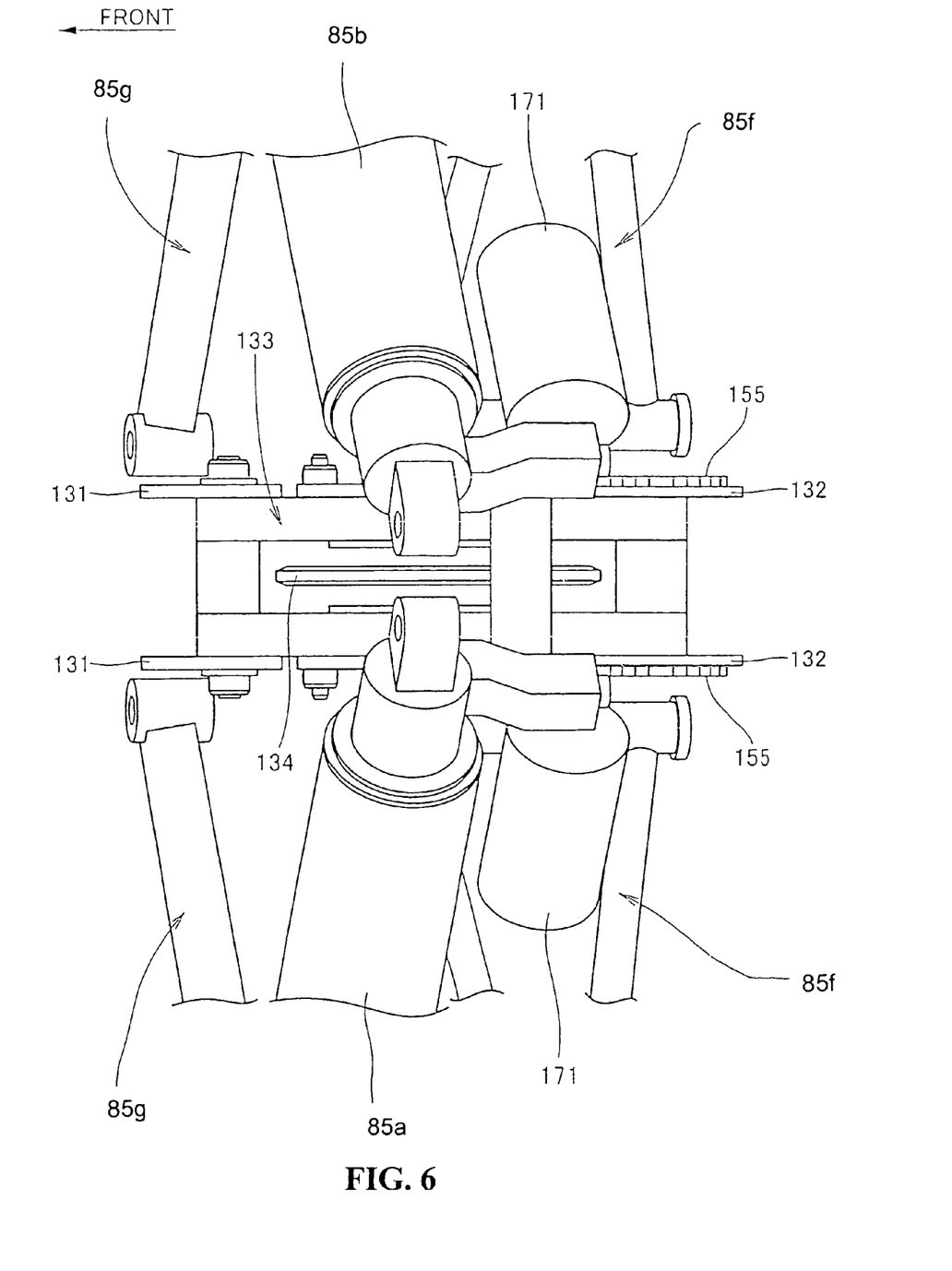
FIG. 6 is a plan view of an essential part showing a rear portion of the vehicle according to the present invention.

FIG. 6 is a plan view of an essential part showing a rear portion of the vehicle according to the present invention. A front portion of the final gear case 133 is mounted on the left and right case support brackets 131, 131 and, at the same time, a rear portion of the final gear case 133 is mounted on the left and right case support brackets 132, 132. The snail cam 155 is arranged outside the respective case support brackets 132, 132, and the driven sprocket 134 is arranged in the inside of the final gear case 133.

A reserve tank 171 which stores oil flowing into or out from the cylinder is integrally mounted on the rear cushion units 85a, 85b.

Figure 7:
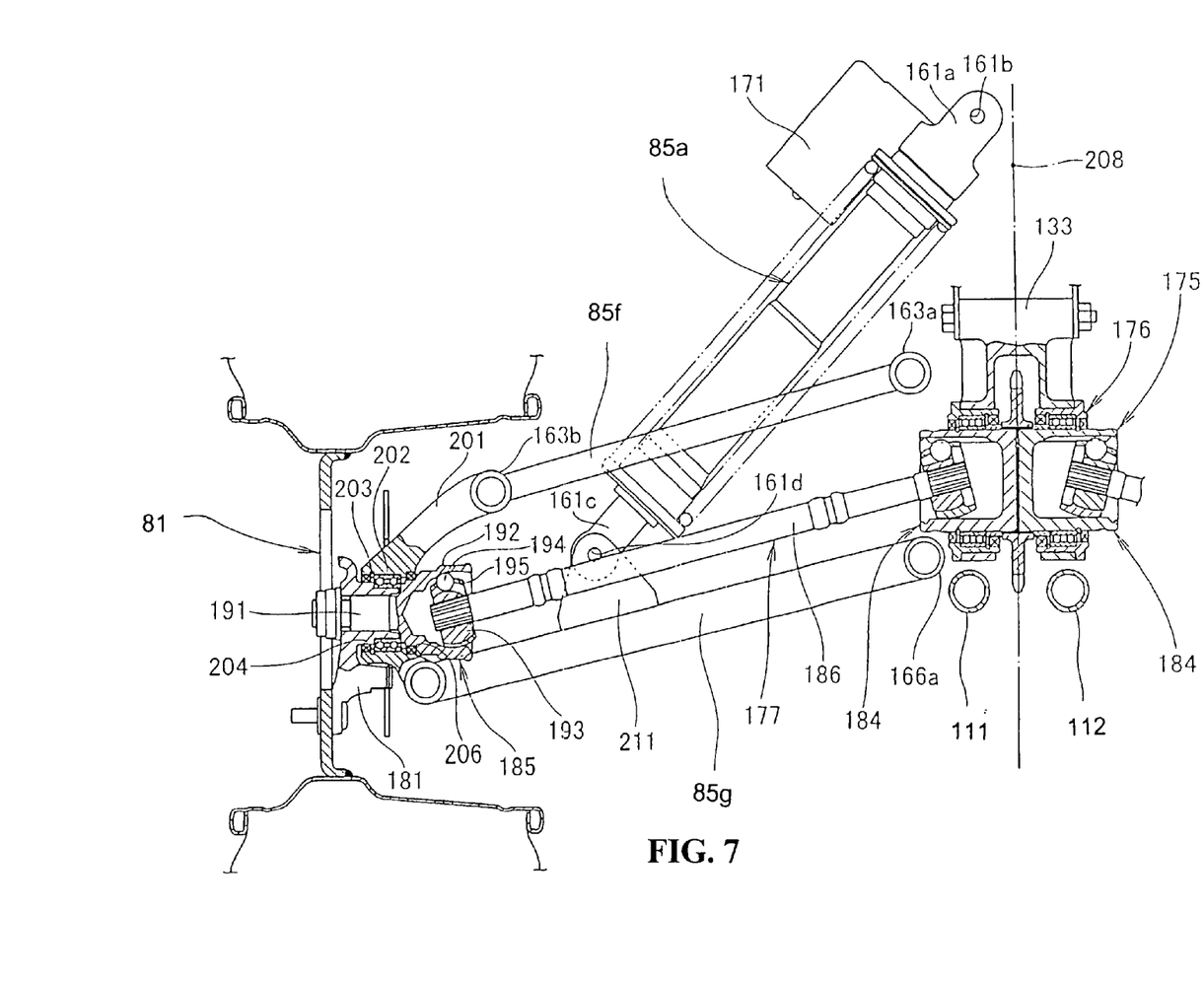
FIG. 7 is a back view showing a drive force transmitting portion of the vehicle according to the present invention.

FIG. 7 is a back view (a partial cross-sectional view) showing the drive force transmitting portion of the vehicle according to the present invention.

The drive force transmitting portion 175 includes the above-mentioned drive sprocket wheel (not shown in the drawing), a chain 118, a final gear case 133, bearing portions 176 which are supported on the final gear case 133, left and right drive shafts 177, 178 (showing only the reader's-side drive shaft indicated by symbol 178) which have one ends thereof supported on the bearing portions 176, and hubs 181, 182 (showing only the reader's-side hub indicated by symbol 181) which are connected to distal ends of the drive shafts 177, 178, wherein the rear wheels 81, 82 (showing only the reader's-side rear wheel indicated by symbol 81) are mounted on the hubs 181, 182.

The drive shaft 177 includes a slide-type constant velocity joint 184 which is connected to a bearing portion 176 side in a swingable manner as well as in an extensible and shrinkable manner in the axial direction, a fixed constant velocity joint 185 which is connected to a hub 181 side in a swingable manner, and a shaft 186

The constant velocity joint 185 includes an outer lace 192 which is integrally formed with an axle 191 of the rear wheel 81, an inner lace 193 which is connected to one end of the shaft 186 by spline engagement, a plurality of balls 194 which are movably arranged in the inside of a plurality of ball grooves formed in an inner peripheral surface of the outer lace 192 and an outer peripheral surface of the inner lace 193, and a cage 195 which holds these balls 194.

The drawing indicates knuckle arms 201 which are connected to respective distal ends of the upper arms 85f, 85f (showing only the reader's-side upper arm indicated by symbol 85f) and the lower arms 85g, 85g (showing only the reader's-side lower arm indicated by symbol 85g), and the knuckle arms 201 serve to rotatably support the constant velocity joint 185 by way of the bearing 202. Also shown is a retainer ring 203 which fixes the bearing 202, and seal members 204, 206.

The rear cushion unit 85a is a part which arranges one mounting portion 161a which is mounted on the vehicle body frame 11 (see FIG. 1), to be more specific, the mounting holes 161b on a side closer to the center of the vehicle (a vertical line 208 indicating the center in the vehicle-width direction of the vehicle) than the respective mounting portions 163a, 166a of the upper arm 85f and the lower arm 85g to the vehicle body frame 11 side.

The reason that the mounting hole 161b of the rear cushion unit 85a is arranged closer to the center of the vehicle than the mounting portions 163a, 166a of the upper arm 85f and the lower arm 85g is that it is possible to ensure a large stroke quantity of the rear cushion unit 85a by increasing a total length of the rear cushion unit 85a.

The reason that the mounting hole 161b of the rear cushion unit 85a is arranged closer to the center of the vehicle than the mounting portions 163a, 166a of the upper arm 85f and the lower arm 85g is that it is possible to ensure a large stroke quantity of the rear cushion unit 85a by increasing a total length of the rear cushion unit 85a.

Here, although the rear cushion unit 85a is largely inclined, the rear cushion unit 85a includes the reservoir tank 171 and hence, the inside of the rear cushion unit 85a is filled with oil whereby no liquid surface of oil is present in the rear cushion unit 85a and the liquid surface of oil is present in the inside of the reservoir tank 171. Accordingly, for example, compared to a cushion unit which is not provided with a reservoir tank in which a liquid surface of oil present in the inside of the cushion unit is liable to easily change a position thereof depending on temperature, jolting of the vehicle body or the like, according to the present invention, there is no possibility that the liquid surface changes in the inside of the rear cushion unit 85a.

On respective upper portions of the lower arms 85a, 85a, cushion mounting brackets 211, 211 (showing only the reader's-side cushion mounting bracket indicated by symbol 211) which mount another mounting portion 161c of the rear cushion unit 85a thereon are mounted.

The positions of the upper arm 85f and the lower arm 85g in the drawing are positions taken in a state that the rear wheels 81, 82 are brought into contact with a ground and no occupant is in the vehicle. This state is referred to as an vacant vehicle state.

In this vacant vehicle state, the mounting portion 161c of the rear cushion unit 85a, to be more specific, the mounting hole 161d of the rear cushion unit 85a is overlapped to the shaft 186 of the drive shaft 177.

As shown in FIG. 4, according to the present invention, firstly, in the vehicle 10 in which the engine 12 is mounted on the vehicle body frame 11, the intake device 46 which includes the throttle body 52 is connected to the engine 12, and the battery 86 is arranged inside the upper frames 21, 22 as the pair of left and right frame members which constitute the vehicle body frame 11 (or the lower frames 23, 24 as the pair of left and right frame members which constitute the vehicle body frame 11), the throttle body 52 is arranged on either one of left and right sides with respect to the vehicle body center line 90 which extends in the longitudinal direction of a vehicle body, and the battery 86 is arranged on another side with respect to the vehicle body center line 90.

The throttle body 52 is arranged on either one of left and right sides with respect to the vehicle body center line 90 and the battery 86 is arranged on another side with respect to the vehicle body center line 90 and hence, the battery 86 can be arranged in the space 104 formed by arranging the throttle body 52 on one side with respect to the vehicle body center line 90. Accordingly, it is possible to effectively make use of the space of the vehicle body, for example, the space 105 defined between the upper frames 21, 22 (or the lower frames 23, 24) and hence, the vehicle body can be made compact or can be miniaturized. Further, the battery 86 can be arranged in the vicinity of the engine 12 and hence, it is possible to concentrate the engine 12 and the battery 86 which constitute heavy loads on the center side of the vehicle body. Accordingly, the traveling performance such as turning characteristics or the like of the vehicle 10 can be enhanced.

The present invention is secondly characterized in that the air cleaner 54 is arranged behind the battery 86, and the battery 86 is arranged on the side of the connecting tube 53 which allows the throttle body 52 and the air cleaner 54 to communicate with each other.

The air cleaner 54 is arranged behind the battery 86 and the battery 86 is arranged on the side of the connecting tube 53 and hence, it is possible to efficiently arrange the throttle body 52, the connecting tube 53 and the air cleaner 54 which constitute the intake device 46 and the battery 86 on the vehicle body whereby the vehicle body can be made compact or can be miniaturized.

The present invention is thirdly characterized in that the engine 12 includes the exhaust device 47, and the exhaust pipe 56 which constitutes the exhaust device 47 is allowed to pass below the throttle body 52 and to extend toward the rear portion of the vehicle body from the engine 12.

The exhaust pipe 56 is allowed to pass below the throttle body 52 and to extend toward the rear portion of the vehicle body from the engine 12 and hence, by arranging the battery 86 on the side opposite to the side on which the throttle body 52 and the exhaust pipe 56 are arranged with respect to the vehicle body center line 90, the left-and-right weight balance of the vehicle body can be enhanced.

The battery arrangement structure of the present invention is suitably applicable to a vehicle which includes a pair of left and right flails which extend in the longitudinal directions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery arrangement structure of a vehicle in which an engine is mounted on a vehicle body frame, an intake device which includes a throttle body is connected to the engine, and a battery is arranged inside portions of a pair of left and right rear frame members of the vehicle body frame which extend substantially parallel to a vehicle body center line which extends in a longitudinal direction of the vehicle,
　　wherein the vehicle body frame includes:
　　　　left and right upper members, and
　　　　left and right rear frame members which extend rearwardly from the corresponding left and right upper frame member,
　　wherein the throttle body is arranged on either one of a left lateral side and a right lateral side with respect to the vehicle body center line, and the battery is arranged on another side with respect to the vehicle body center line,
　　wherein when the vehicle body frame is viewed facing the left lateral side, a portion of the left rear frame member which extends substantially parallel to a vehicle body center line is seen to overlap the battery, and an air cleaner disposed rearwardly with respect to the battery, and the throttle body is overlapped by the left upper frame member at a position where the left rear frame member joins the left upper frame member.

2. The battery arrangement structure of a vehicle according to claim 1, wherein the battery is arranged on a side of a connecting tube which allows the throttle body and the air cleaner to communicate with each other.

3. The battery arrangement structure of a vehicle according to claim 2, wherein the engine includes an exhaust device, and an exhaust pipe which constitutes the exhaust device is allowed to pass below the throttle body and to extend to a rear portion of the vehicle body frame from the engine.

4. The battery arrangement structure of a vehicle according to claim 2, wherein a middle portion of the connecting tube is bent away from the vehicle body center line on the right side of the vehicle, and the battery is arranged on the left side of the vehicle body center line in a space that is opposite with respect to the bent middle portion of the connecting tube.

5. The battery arrangement structure of a vehicle according to claim 2, wherein the battery is disposed in a position between the engine and the air cleaner.

6. The battery arrangement structure of a vehicle according to claim 1, wherein the engine includes an exhaust device, and an exhaust pipe which constitutes the exhaust device is allowed to pass below the throttle body and to extend to a rear portion of the vehicle body frame from the engine.

7. The battery arrangement structure of a vehicle according to claim 1, wherein the vehicle body frame includes left and right lower frame members, and when the vehicle body frame is viewed facing the left lateral side, a portion of the left lower frame member is seen to overlap the air cleaner.

8. The battery arrangement structure of a vehicle according to claim 1, wherein the left and right rear frame members are substantially U-shaped.

9. The battery arrangement structure of a vehicle according to claim 1, wherein the throttle body is disposed adjacently to and slightly above the portion of the right rear frame member of the vehicle body frame which extends substantially parallel to the vehicle body center line.

10. The battery arrangement structure of a vehicle according to claim 1, the vehicle body frame including a cross pipe extending laterally between the left and right rear frame members, the cross pipe being disposed between the battery and the air cleaner.

11. A battery arrangement structure of a vehicle comprising:
　　pairs of upper and lower left and right frame members which constitute a vehicle body frame;
　　an engine mounted on the lower left and right frame members;
　　an intake device which includes a throttle body connected to the engine;
　　a battery arranged inside portions of left and right rear frame members which extend substantially parallel to a vehicle body center line which extends in a longitudinal direction of the vehicle; and
　　wherein the vehicle body frame includes left and right rear frame members each of which is substantially U-shaped,
　　wherein the throttle body is arranged on either one of a left lateral side and a right lateral side with respect to a vehicle body center line, and the battery is arranged on another side with respect to the vehicle body center line, and
　　wherein when the vehicle body frame is viewed facing the left lateral side, a portion of the substantially U-shaped left rear frame member which extends substantially parallel to a vehicle body center line is seen to overlap the battery, and an air cleaner disposed rearwardly with respect to the battery, and the throttle body is overlapped by the left upper frame member at a position where the left rear frame member joins the left upper frame member.

12. The battery arrangement structure of a vehicle according to claim 11, wherein the battery is arranged on a side of a connecting tube which allows the throttle body and the air cleaner to communicate with each other.

13. The battery arrangement structure of a vehicle according to claim 12, wherein the engine includes an exhaust device, and an exhaust pipe which constitutes the exhaust device is allowed to pass below the throttle body and to extend to a rear portion of the vehicle body frame from the engine.

14. The battery arrangement structure of a vehicle according to claim 12, further comprising an exhaust pipe which passes below the throttle body and the connecting tube,
　　wherein the battery is arranged on one side of the connecting tube, and
　　wherein the exhaust pipe and the connecting tube pass under a cross pipe extending laterally between the left and right rear frame members.

15. The battery arrangement structure of a vehicle according to claim 12, wherein a middle portion of the connecting tube is bent away from the vehicle body center line on a right side of the vehicle, and the battery is arranged on the left side of the vehicle body center line in a space opposite with respect to the bent middle portion of the connecting tube.

16. The battery arrangement structure of a vehicle according to claim 12, wherein the battery is disposed in a position between the engine and the air cleaner.

17. The battery arrangement structure of a vehicle according to claim 11, wherein the engine includes an exhaust device, and an exhaust pipe which constitutes the exhaust device is allowed to pass below the throttle body and to extend to a rear portion of the vehicle body frame from the engine.

18. The battery arrangement structure of a vehicle according to claim 11, wherein when the vehicle body frame is viewed facing the left lateral side, a portion of the left lower frame member is seen to overlap the air cleaner.

19. The battery arrangement structure of a vehicle according to claim 11, wherein the battery is arranged above a rear portion of a transmission of the vehicle.

20. The battery arrangement structure of a vehicle according to claim 11, wherein the throttle body is disposed adjacently to and slightly above the portion of the right rear frame member of the vehicle body frame which extends substantially parallel to the vehicle body center line.

21. The battery arrangement structure of a vehicle according to claim 11, the vehicle body frame including a cross pipe extending laterally between the left and right rear frame members, the cross pipe being disposed between the battery and the air cleaner.

22. A battery arrangement structure of a vehicle in which an engine is mounted on a vehicle body frame, an intake device which includes a throttle body is connected to the engine, and a battery is arranged inside a pair of left and right rear frame members of the vehicle body frame, the vehicle body frame also including a cross pipe extending laterally between the left and right rear frame members, the cross pipe being disposed between the battery and an air cleaner which is disposed behind the battery;

wherein the battery is arranged on a side of a connecting tube which allows the throttle body and the air cleaner to communicate with each other, and  further comprising an exhaust pipe which passes below the throttle body and the connecting tube,  wherein the exhaust pipe and the connecting tube pass under the cross pipe extending laterally between the left and right rear frame members.

\* \* \* \* \*